United States Patent
Nishijima et al.

(10) Patent No.: US 6,214,463 B1
(45) Date of Patent: Apr. 10, 2001

(54) HYDROPHILIC FIBERS AND CLOTH-LIKE ARTICLES AND FILTERS MADE BY USING THE SAME

(75) Inventors: Masaru Nishijima, Moriyama; Masayasu Suzuki, Yasu-gun; Satoshi Ogata, Amagasaki; Kozo Tanoue, Yasu-gun, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/202,155

(22) PCT Filed: Jun. 26, 1997

(86) PCT No.: PCT/JP97/02209

§ 371 Date: Dec. 9, 1998

§ 102(e) Date: Dec. 9, 1998

(87) PCT Pub. No.: WO97/49855

PCT Pub. Date: Dec. 31, 1997

(30) Foreign Application Priority Data

Jun. 26, 1996 (JP) ................................ 8-186619
Sep. 23, 1996 (JP) ................................ 8-241149

(51) Int. Cl.[7] .................................................. D02G 3/00
(52) U.S. Cl. ................... 428/375; 428/395; 428/394; 428/373; 428/480
(58) Field of Search ................... 428/375, 394, 428/395, 373, 480

(56) References Cited

U.S. PATENT DOCUMENTS

| | | | |
|---|---|---|---|
| 3,993,571 | * 11/1976 | Marshall | 252/8.9 |
| 4,552,671 | * 11/1985 | Ogiso et al. | 252/8.9 |
| 4,789,588 | * 12/1988 | Suzuki et al. | 428/288 |
| 4,995,884 | 2/1991 | Ross et al. | 8/115.6 |
| 5,087,520 | * 2/1992 | Suzuki et al. | 428/389 |
| 5,232,742 | 8/1993 | Chakvarti | 427/387 |
| 5,654,086 | * 8/1997 | Nishijima et al. | 442/199 |
| 5,902,679 | * 5/1999 | Kojima et al. | 428/375 |

FOREIGN PATENT DOCUMENTS

| | | |
|---|---|---|
| 0 334 579 | 9/1989 | (EP) . |
| 55-163266 | 12/1980 | (JP) . |
| 63-38453 | 2/1988 | (JP) . |
| 63-49158 | 3/1988 | (JP) . |
| 64-6173 | 1/1989 | (JP) . |
| 2-169774 | 6/1990 | (JP) . |

* cited by examiner

*Primary Examiner*—William Krynski
*Assistant Examiner*—B. Shewareged
(74) *Attorney, Agent, or Firm*—Fay, Sharpe, Fagan, Minnich & McKee, LLP

(57) ABSTRACT

Hydrophilic fibers having a durable hydrophilic property and excellent safety, and fabrics and filters both obtained by using the fibers are provided; the hydrophilic fibers are produced by adhering 0.1 to 1.0% by weight, based on the weight of fiber, of a finishing agent comprising 20 to 90% by weight of the following composition (A) and 10 to 80% by weight of the following composition (B), to a fiber comprising one or more thermoplastic resins having a water absorption of 1% by weight or lower:

(A) a composition comprising 0 to 75% by weight of at least one compound selected from the group consisting of sorbitan esters of a fatty acid having 12 to 18 carbon atoms and 25 to 100% by weight of at least one compound selected from the group consisting of adducts of a sorbitan ester of a fatty acid having 12 to 18 carbon atoms with 5 to 20 mole of ethylene oxide;

(B) at least one compound selected from the group consisting of (a) white mineral oils, (b) diesters of a fatty acid having 12 to 18 carbon atoms with a polyethylene glycol having a molecular weight of 200 to 600, (c) diesters of a fatty acid having 12 to 18 carbon atoms with a polypropylene glycol having a molecular weight of 200 to 600, (d) pluronic type nonionic surface active agents, and (e) metal salts of an alkyl sulfonate having 8 to 16 carbon atoms.

11 Claims, No Drawings

HYDROPHILIC FIBERS AND CLOTH-LIKE ARTICLES AND FILTERS MADE BY USING THE SAME

TECHNICAL FIELD

The present invention relates to hydrophilic fibers, and cloths and filters produced by using the fibers. More specifically, it relates to hydrophilic fibers which have a high safety and durable hydrophilic property, and are useful mainly for filter materials such as a tea pack and the likes, drip absorbing materials for maintaining freshness of foods, and packaging materials for preventing dewing employed in the field of foods, and useful for wiping cloth materials and liquid filters employed in the field of industry or medical care. Further, the invention relates to cloths and filters produced by using the fibers. For brevity, the term "cloth or cloths" used in this specification includes not only cloth or cloths but also fabric or fabrics.

BACKGROUND ART

Fibers comprising a thermoplastic resin typical examples of which are polyethylene, polypropylene, and polyester have application in various fields since the fibers are easy to handle and can be processed at a comparatively low cost. Since these thermoplastic resins are hydrophobic (water absorption is lower than 1%), the fibers produced from such a resin are ready to be charged with static electricity and tend to produce various troubles when processed, for example, into non-woven fabrics. For the purpose of preventing the fibers from being charged with static electricity, or for the purpose of imparting hydrophilic property to the fibers when they are used for application, for example, in tea packs and filters, wherein fibers are required to have a hydrophilic property, such treatments as applying one of various kind of finishing agents containing a surface active agent on the surface of the fibers are being performed to adhere the finishing agent to the fiber.

In order to use such fibers to which a surface active agent is adhered in the field of foods, the surface active agent should be low in toxicity because the surface active agent will flows out when the fibers are put in water once or twice. Besides, such problems are raised that water permeability decreases and filtration resistance increases for tea packs and filters, respectively, since the hydrophilic property of the fibers is suddenly decreased due to the outflow of the surface active agent.

As the surface active agents which are small in the effluence from the fibers and can durably maintain the hydrophilic property of the fibers, sorbitan ester-ethylene oxide adducts are known. However, the sorbitan ester-ethylene oxide adducts have such a defect that the water in which the fibers or cloths having the adduct applied thereon were immersed are ready to foam or become cloudy since the adducts have a high foaming property.

DISCLOSURE OF THE INVENTION

An object of the present invention is to provide hydrophilic fibers which maintain hydrophilic property even when immersed in water, and the surface active agent flowed out of which fibers is excellent in safety and low in foaming property; and to provide cloths and filters produced by using the fibers.

As a result of diligent research conducted in succession by the present inventors to solve the problems described above, it has been found out that the expected objects can be achieved by applying an aqueous solution of a composition of a specific surface active agent as finishing agent on the fiber surface to adhere the finishing agent to the fiber, leading to accomplishment of the present invention.

The present invention is summarized as follows:

(1) A hydrophilic fiber produced by adhering 0.1 to 1.0% by weight, based on the weight of fiber, of a finishing agent comprising 20 to 90% by weight of the following composition (A) and 10 to 80% by weight of the following composition (B), to a fiber comprising one or more thermoplastic resins having a water absorption of 1% by weight or lower:

(A) a composition comprising 0 to 75% by weight of at least one compound selected from the group consisting of sorbitan esters of a fatty acid having 12 to 18 carbon atoms and 25 to 100% by weight of at least one compound selected from the group consisting of adducts of a sorbitan ester of a fatty acid having 12 to 18 carbon atoms with 5 to 20 mole of ethylene oxide;

(B) at least one compound selected from the group consisting of (a) white mineral oils, (b) diesters of a fatty acid having 12 to 18 carbon atoms with a polyethylene glycol having a molecular weight of 200 to 600, (c) diesters of a fatty acid having 12 to 18 carbon atoms with a polypropylene glycol having a molecular weight of 200 to 600, (d) pluronic type nonionic surface active agents, and (e) metal salts of an alkyl sulfonate having 8 to 16 carbon atoms.

(2) The hydrophilic fiber recited in paragraph (1) above wherein the fiber comprising one or more thermoplastic resins is a composite fiber comprising two kind of thermoplastic resins having a difference in melting point of 10° C. or more.

(3) The hydrophilic fiber recited in paragraph (1) above wherein at least one of the thermoplastic resins which form the fiber is a polyolefin resin.

(4) The hydrophilic fiber recited in paragraph (1) above wherein at least one of the thermoplastic resins which form the fiber is a polyester resin.

(5) A cloth obtained by entangling, adhering, weaving, or knitting the hydrophilic fibers defined in any one of claims 1 to 4.

(6) A hydrophilic cloth produced by adhering 0.1 to 1.0% by weight, based on the weight of fiber, of a finishing agent comprising 20 to 90% by weight of the following composition (A) and 10 to 80% by weight of the following composition (B), to a cloth composed of fibers comprising one or more thermoplastic resins having a water absorption of 1% by weight or lower:

(A) a composition comprising 0 to 75% by weight of at least one compound selected from the group consisting of sorbitan esters of a fatty acid having 12 to 18 carbon atoms and 25 to 100% by weight of at least one compound selected from the group consisting of adducts of a sorbitan ester of a fatty acid having 12 to 18 carbon atoms with 5 to 20 mole of ethylene oxide;

(B) at least one compound selected from the group consisting of (a) white mineral oils, (b) diesters of a fatty acid having 12 to 18 carbon atoms with a polyethylene glycol having a molecular weight of 200 to 600, (c) diesters of a fatty acid having 12 to 18 carbon atoms with a polypropylene glycol having a molecular weight of 200 to 600, (d) pluronic type nonionic surface active agents, and (e) metal salts of an alkyl sulfonate having 8 to 16 carbon atoms.

(7) A filter fabricated by using the hydrophilic fiber recited in paragraph (1) above.

(8) The filter recited in paragraph (7) above wherein the fiber comprising one or more thermoplastic resins is a composite fiber comprising two kind of thermoplastic resins having a difference in melting point of 10° C. or more.

Now, the present invention will be described in more detail.

As the thermoplastic resin used as the material for the hydrophilic fibers of the present invention and having a water absorption of 1% by weight or lower, polyolefin resins and polyester resins can preferably be mentioned as example.

As the polyolefin resins, copolymers of propylene as the main component with ethylene, butene-1, or 4-methylpentene-1 in addition to polyethylenes and polypropylenes can be mentioned as example. As polyester resins, polyethylene terephthalates, polybutylene terephthalates, copolymer of ethylene terephthalate with isophthalate, and copolymerized polyetheresters can be mentioned as example.

These thermoplastic resins can singly be formed into fibers by a melt spinning method. Further, it is possible to form two thermoplastic resins selected from such thermoplastic resins as described above and having a difference in melting point of 10° C. or more into composite fibers in which the thermoplastic resins are disposed in side-by-side, concentric sheath-core, eccentric sheath-core, radially-divided, or sea-islands fashion.

Cloths and filters of the present invention can be produced from one kind of single component fibers, mixtures of single component fibers having different melting points, or composite fibers described above.

As the combination of thermoplastic resins in the composite fibers, polyethylene/polypropylene, propylene copolymer/polypropylene, low melting point copolymerized polyester/polyester, and polyethylene/polyester can be mentioned as example. Among them, propylene copolymer/polypropylene and low melting point copolymerized polyester/polyester are preferable because the composite fibers of thermoplastic resins of such combination are melt-adhered each other at their contacting points through the melt of the lower melting point thermoplastic resin by heating the fibers to form a three-dimensional reticulated structure thereby cloths and filters having a high strength can be obtained.

In these thermoplastic fibers, an additive such as a pigment and antioxidant can be blended within the range in which the objects of the present invention are not hampered.

Cross section of the fibers can be made into a circular, multifoliate, hollow, or flat shape. With respect to the fiber length, both short fibers and long fibers can be possible, and the fibers can be crimped or not-crimped. These fiber forms can suitably selected and combined depending on the application of the fibers.

Composition (A) which constitutes the finishing agent used in the present invention comprises 0 to 75% by weight, preferably 1 to 30% by weight of at least one sorbitan fatty acid ester (a) selected from the group consisting of esters of a fatty acid having 12 to 18 carbon atoms with sorbitan, and 25 to 100% by weight of at least one compound selected from the group consisting of compounds (sorbitan fatty acid ester.ethylene oxide adducts) in which 5 to 20 mole of ethylene oxide is added to an ester (b) of a fatty acid having 12 to 18 carbon atoms with sorbitan.

Sorbitan fatty acid ester (a) is an ester of a saturated or unsaturated fatty acid which have 12 to 18 carbon atoms and may have a lateral chain, with sorbitan, and the ester may be any one of monoesters, diesters, triesters, and their mixtures.

Sorbitan fatty acid ester (b) in the sorbitan fatty acid ester.ethylene oxide adducts may be the same compound as or different compound from the sorbitan fatty acid ester (a) described above. The mole number of the ethylene oxide added to the sorbitan fatty acid ester is generally 5 to 20 and preferably 20. When the mole number of ethylene oxide to be added is less than 5, the hydrophilic property is insufficient.

Composition (B) which constitutes the finishing agent used in the present invention is at least one compound selected from the group consisting of (a) white mineral oils, (b) diesters of a saturated or unsaturated fatty acid which have 12 to 18 carbon atoms and may have a lateral chain with a polyethylene glycol having a molecular weight of 200 to 600, (c) diesters of a saturated or unsaturated fatty acid which have 12 to 18 carbon atoms and may have a lateral chain, with a polypropylene glycol having a molecular weight of 200 to 600, (d) pluronic type nonionic surface active agents, and (e) metal salts of an alkyl sulfonate having 8 to 16 carbon atoms. These compounds perform a function of suppressing or extinguishing the foaming of a solution of a finishing agent and improves processability of fibers.

In the finishing agents used in the present invention, the amount of composition (A) to be blended is 20 to 90% by weight. When the amount is less than 20% by weight, sufficient hydrophilic property can not be obtained. When the amount exceeds 90% by weight, the foaming property increases and it becomes impossible to obtain a sufficient defoaming effect or foam suppressing effect. In the finishing agents, the amount of composition (B) to be blended is 10 to 80% by weight. When the amount exceeds 80% by weight, a hydrophilic property having a sufficient durability can not be obtained. When the amount is less than 10% by weight, a sufficient defoaming effect or foam suppressing effect comes not to be obtained.

In the finishing agents used in the present invention, compounds other than the composition (A) and composition (B) described above can be added as required within the range in which the objects of the present invention can be accomplished.

In the present invention, the amount of a finishing agent to be adhered to the thermoplastic fibers described above is 0.1 to 1.0% by weight and preferably 0.3 to 0.7% by weight based on the weight of fiber.

When the amount of the finishing agent to be adhered is less than 0.1% by weight, antistatic property and hydrophilic property of fibers are insufficient. When the amount exceeds 1.0% by weight, such problems that winding up of the fibers around a cylinder at a card step occurs, that cloths and filters as final products are sticky to touch, and that filtrates bubble or foam are raised.

There is not any specific restriction in the methods for adhering these finishing agents to thermoplastic fibers, and known methods can be used such as a method wherein an aqueous solution of a finishing agent having a suitable concentration is applied on fibers with an oiling roll in a spinning or stretching step of fibers, a method wherein fibers are immersed in an aqueous solution of a finishing agent, or a method wherein an aqueous solution of a finishing agent is sprayed on fibers. Alternatively, finishing agents can be applied by an immersion method or spray method after fibers were processed into webs, non-woven fabrics, knitted fabrics, or woven fabrics.

There is not any specific restriction in the methods for preparing cloths by using the hydrophilic fibers of the present invention, and known processing methods can be employed. For instance, first, hydrophilic fibers are cut into short fibers and converted into webs by a dry or wet method. Then, the webs are subjected, for example, to a compression with a heated roll or ultrasonic waves, to a melt-adhesion with heated air, or to an entanglement of fibers by a spun lace or needle punch method to obtain non-woven fabrics. Alternatively, any methods wherein knitted fabrics or woven fabrics are obtained by knitting or weaving spun yarns or filament yarns each comprising hydrophilic fibers can be employed.

Further, an object of the present invention can be attained through the following two group of steps:

First, (a) the fibers comprising a thermoplastic resin having a water absorption of 1% by weight or lower are converted into webs by a dry method or wet method without applying a finishing agent which is used in the present invention; or webs are formed by a spun bond method, melt blow method, or flash spinning method; and (b) the webs are then converted into non-woven fabrics by using the processing method described above. Alternatively, (c) the fibers described above are converted into spun yarns or filament yarns and then converted into knitted fabrics or woven fabrics.

Second, the smoothing agent, fiber converging agent, antistatic agent, machine oil, or the likes adhered to the cloths comprising the non-woven fabrics, knitted fabrics, or woven fabrics are washed away, and a finishing agent used in the present invention is applied on the cloths thus obtained.

In the cases where the cloths prepared by using the hydrophilic fibers of the present invention are passed through a wet web forming step or wet spun lace processing step, and thus a finishing agent is flowed away from the fibers thereby the hydrophilic property of the cloths is reduced, the object of the present invention can be attained by applying again a finishing agent, which is used in the present invention, to the cloths thus obtained.

Hydrophilic fibers of the present invention exhibit an excellent property at a wet processing step. That is, the hydrophilic fibers of the present invention maintain a hydrophilic property and keep dispersibility in water for a long period of time even in the case of fibers comprising a hydrophobic thermoplastic resin having a water absorption lower than 1%, since the outflow of the finishing agent into water at wet steps such as web forming is remarkably slow and water having the finishing agent dissolved therein is weak in foaming property.

Hydrophilic fibers and cloths of the present invention are useful and can safely be used for (i) materials such as filter materials, for example, tea packs, drip absorbing materials for maintaining freshness of foods, packaging materials for preventing dew employed in the field of foods; (ii) surface materials of medical supplies; (iii) shape maintaining materials of liquid absorbing products; (iv) wiping cloth materials and absorbing pads employed in the field of medical care or industry; and (v) reinforcing fibers for structural materials, membranes for transporting liquids, water conducting pipes, and water permeable sheets employed in engineering and construction industry.

There is not any specific restrictions in the methods for producing filters by using the hydrophilic fibers of the present invention, and various methods hitherto known can be used. For instance, a method described in Japanese Patent Publication No. Sho 56-43139 can be mentioned wherein a web of composite fibers comprising two thermoplastic resins having different melting points is wound up on a winding core while being heated at a temperature at which only low melting point resin is melted, cooled, put away from the core, and then cut into a desired length to obtain cylindrical filters. Also, non-woven fabrics obtained by heating a web of composite fibers at a temperature at which only low melting point resin is melted can be used as they are as filter. Further, it is possible to obtain cylindrical filters by winding a sliver or spun yarns comprising hydrophilic fibers of the present invention on a winding core.

BEST MODE FOR CARRYING OUT THE INVENTION

Now, the present invention will be described in more specifically with reference to Examples and Comparative Examples.

In each of the Examples and Comparative Examples, the following methods were used for evaluating physical properties shown therein:

(1) Card Passability

Sample fibers in an mount of 40 g were converted into a web by using a miniature card tester at a speed of 7 m/min under conditions of 30° C. and a relative humidity of 80%, operation of the card tester was terminated, and then the surface of the cylinder was observed. Card passability was evaluated by the following standards:

Winding up of fibers on the cylinder was not observed:
Fairly good (○)
Winding up of fibers on the cylinder was observed:
Bad (X)

(2) Foaming Test

Aqueous solutions of a finishing agent in an amount of 1000 $cm^3$ at a concentration of 0.10% by weight or 0.01% by weight were put in glass beakers having an inside diameter of 143 mm and a height of 270 mm, respectively, air was blown into the solutions at a rate of 2000 $cm^3$/min for 3 min, and then the height of the foam for the solutions both immediately after the blowing was terminated and 1 min after the blowing was terminated were determined, respectively.

(3) Hydrophilic Property of Cloths

Test specimen of 10 cm×10 cm was cut away from a cloth having a basis weight (Metsuke) of 30 $g/m^2$, the test specimen was placed over a paper diaper available on the market, and a cylinder having an inside diameter of 6 cm was placed thereon. Water in an amount of 65 $cm^3$ was poured in the cylinder to make the water pass through the test specimen and to be absorbed with the paper diaper. They were allowed to stand for 3 min, the test specimen was put between 2 filter papers (Toyo filter paper No. 50), a board of 10 cm×10 cm and a weight of 3.5 kg were placed thereon, and then allowed to stand for 3 min to make the water being absorbed with the filter paper. The test specimen was separated from the filter papers, subjected to air dry for 5 min, and then placed on a fresh filter paper (Toyo filter paper No. 50). Subsequently, the water adjusted at 23±2° C. was dropped by using a pipette from a position 1 cm above the test specimen to 10 spots on the specimen with the spot being shifted for each drop, and then the number of the water drops which disappeared from the surface of the test specimen in 30 seconds after the dropping was determined.

Test specimen used for the determination was placed on another paper diaper available on the market again, the procedures described above were repeated, and the procedures were terminated when the number of the water drops which did not disappear in 30 seconds on the surface of the test specimen became 5 or more.

Cloths with which the procedures described were repeated thrice or more were judged to be excellent in maintenance of hydrophilic property.

(4) Safety Test of Filtrate (According to JIS K-0102: Acute Toxic Test Using Fishes)

One filter was fitted in a housing of a circulation type filter performance tester, water was circulated with a pump, and 5 l of water circulated at the initial stage of the circulation was sampled. Three himedakas (Japanese killifish; cultured type (Olyzais latipes latipes)) were put in the sampled water, and the number of surviving himedakas was counted 24 hours after they were put therein. The safety was evaluated by the following standard:

All himedakas were surviving: Fairly good (O)

One or more himedakas were killed: Bad (X)

(5) Foaming Test of Filtrate

One filter was fitted in a housing of a circulation type filter performance tester, water was circulated with a pump at a rate of 30 l/min, and 1 l of the water circulated at the initial stage of circulation was sampled. Sampled filtrate in an amount of about 50 ml was put in a 100 ml measuring cylinder, and then the height (mm) of the foam both immediately after the sampled water was put in the cylinder and immediately after the sampled water was poured in the cylinder and allowed to stand therein for 1 min were determined, respectively.

(6) Particle Removal Efficiency (Filtration Rating)

One filter was fitted in a housing of a circulation type filter performance tester, and AC coarse test dust (ACCTD: medium diameter is 27 to 31 $\mu$m) was added into a tank for raw water at a rate of 5 g/min while circulating water at a rate of 30 l/min. Five minute after the beginning of addition of the dust, raw water and filtrate were sampled. The concentration of particles and the particle size distribution were determined for each of the liquids by using a light interception type apparatus for measuring particle size distribution, and particle removing efficiency for each particle size were calculated.

EXAMPLES 1 TO 6 AND COMPARATIVE EXAMPLES 1 TO 2

Foaming test was performed for various kind of finishing agents shown in Table 1. Results thus obtained are also shown in Table 1.

Among the finishing agents described above, the agents which are excellent in defoaming property were selected and applied on the cloths which were prepared by processing the following test fibers a, b, or c by the following processing method A, B, or C, respectively, and applied on the non-woven fabric which was prepared by processing method D; and card passability of the fibers and maintenance of hydrophilic property of the cloths were evaluated. Results thus obtained are shown in Table 2.

Test Fibers A

High density polyethylene having a melting point of 131° C. and a melt flow rate (hereinafter referred to as MFR: determined at 190° C. under a load of 2.16 kg) of 13 g/10 min as sheath component and a polypropylene having a MFR (230° C., 2.16 kg) of 10 g/10 min as core component were extruded to form sheath-core type composite filaments at a spinning temperature of 300° C. and then the filaments were stretched to obtain composite fibers having a filamentary denier of 2d.

Test Fibers B

Polypropylene having a melting point of 165° C. and a MFR (230° C., 2.16 kg) of 10 g/10 min was spun at a spinning temperature of 300° C. into filaments and then the filaments were stretched to obtain single component fibers having a filamentary denier of 2 d.

Test Fibers C

High density polyethylene having a MFR (190° C., 2.16 kg) of 13 g/10 min as sheath component and a polyester having a melting point of 254° C. and an intrinsic viscosity of 0.65 determined in o-chloroform at 35° C. as core component were extruded to form sheath-core type composite filaments and then the filaments were stretched to obtain fibers having a filamentary denier of 2 d.

Processing Method A

Test fibers were cut into a length of 51 mm, converted into a card web by a miniature card machine, and then heat treated with a suction drier at 140° C. to obtain a non-woven fabric having a basis weight of about 30 g/m$^2$.

Processing Method B

Test fibers were cut into a length of 51 mm, converted into a card web by a miniature card machine, and then heat treated with an embossing roll at 135° C. and under a linear pressure of 20 kg/cm to obtain a non-woven fabric having a basis weight of about 30 g/m$^2$.

Processing Method C

Test fibers were cut into a length of 38 mm, converted into a card web by a miniature card machine, and then processed with a ring spinning machine to obtain spun yarns having a yarn count of 30. The spun yarns thus obtained were knitted into a 22 gauge circular rib fabric.

Processing Method D

Web was prepared through a spun bond method by using a polypropylene having a MFR (230° C., 2.16 kg) of 30 g/10 min, and the web thus obtained was heat treated with an embossing roll at 140° C. and under a linear pressure of 20 kg/cm to obtain a spun bond non-woven fabric having a basis weight of 35 g/m$^2$.

TABLE 1

| | Compound in finishing agent / No. of finishing agent | 1 | 2 | 3 | 4 | 5 | 6 | 7 |
|---|---|---|---|---|---|---|---|---|
| Composition A | Sorbitan monooleate | 20 | | | 5 | | 80 | |
| | Sorbitan monolaurate | | 5 | | | | | 65 |
| | Sorbitan monopalmitate.POE (20) | 10 | 52 | 75 | | 100 | 20 | 30 |
| | Sorbitan monooleate.POE (20) | | | | 20 | | | |
| Composition B | Liquid paraffin (15 to 30 carbon atoms) | 30 | | | | | | |
| | PEG (400).dioleate | | 31 | 20 | | | | |
| | PEG (200).dilaurate | 30 | | | | | | 5 |
| | Sodium lauryl sulfonate | 10 | 12 | 5 | 2 | | | |
| | Nyuporu PE-62 *1 | | | | 73 | | | |
| Foaming test | 0.1 wt % Immediately after air was blown (mm) | 5 | 20 | 13 | 13 | 145 | 120 | 80 |
| | 1 min after air was blown (mm) | 0 | 1 | 0 | 1 | 140 | 100 | 40 |

TABLE 1-continued

| Compound in finishing agent / No. of finishing agent | | 1 | 2 | 3 | 4 | 5 | 6 | 7 |
|---|---|---|---|---|---|---|---|---|
| 0.01 wt % | Immediately after air was blown (mm) | 0 | 20 | 15 | 12 | 165 | 110 | 85 |
| | 1 min after air was blown (mm) | 0 | 1 | 4 | 3 | 160 | 80 | 50 |

*1 Nyuporu PE-62: Trade name of a pluronic type nonionic surface active agent (average molecular weight 2000) produced by Sanyo Chemicals Co., Ltd.

TABLE 2

| | Example 1 | Example 2 | Example 3 | Example 4 | Comparative Example 1 | Comparative Example 2 | Example 5 | Example 6 |
|---|---|---|---|---|---|---|---|---|
| No. of finishing agent | 1 | 2 | 3 | 4 | 1 | 1 | 1 | 1 |
| Amount of adhered finishing agent (%) | 0.5 | 0.9 | 0.4 | 0.3 | 0.07 | 1.5 | 0.3 | 0.3 |
| Test fibers | a | a | b | c | a | a | a | — |
| Card passability | ○ | ○ | ○ | ○ | X | X | ○ | — |
| Processing method | A | A | B | A | A | A | C | D |
| Maintenance of hydrophilic property (number of times) | 4 | 5 | 4 | 3 | 1 | 4 | 3 | 4 |

EXAMPLES 7 TO 10 AND COMPARATIVE EXAMPLES 3 TO 5

Finishing agent Nos. 1 to 7 was applied on test fibers a to adhere the finishing agent thereto each in an amount of 0.9% by weight, and the fibers were cut into a length of 51 mm, respectively. The cut fibers were processed with a card machine to obtain webs having a basis weight of 30 g/m². While being heated with an air through type heat treating apparatus (at 140° C., wind velocity 1.2 m/min), the card webs were wound up on metal cores each having a diameter of 30 mm until outside diameter of wound up webs became 65 mm, respectively. After the wound webs were cooled, the cores were pulled out and the wound webs were cut into a length of 250 mm to obtain cylindrical filters. Results thus obtained are shown in Table 3.

EXAMPLE 11 AND COMPARATIVE EXAMPLES 6 TO 7

Finishing agent No. 1 was adhered to test fibers a at various levels, and cylindrical filters were obtained in the same processing method as in Example 7 described above. In the case where the amount of the adhered finishing agent was 0.07% by weight, card processing was unstable due to the generation of static electricity and thus filters was unable to obtain.

Results thus obtained are shown in Table 4.

EXAMPLE 12

High density polyethylene having a melting point of 131° C. and a MFR (190° C., 2.16 kg) of 15 g/10 min was spun into filaments at a spinning temperature of 260° C. and then the filaments were stretched to obtain fibers having a filamentary denier of 2 d.

In a separate step, a polyethylene terephthalate having a melting point of 254° C. and an intrinsic viscosity of 0.64 determined in o-chloroform at 35° C. was spun into filaments at a spinning temperature of 320° C. and then the filaments were stretched to obtain fibers having a filamentary denier of 2 d.

Finishing agent No. 1 was adhered to each of the two types of the filaments described above in an amount of 0.9% by weight and then the filaments were cut into a length of 51 mm. These two types of short fibers were mixed at a weight ratio of 1:1 and then processed with a card machine to form a web having a basis weight of 30 g/m².

While being heated with a hot-air drying type heat treating apparatus (atmospheric temperature inside the apparatus is 140° C.) provided with a far-infrared heater, the card web was wound up on a metal core having a diameter of 30 mm until the outside diameter of wound web became 65 mm. After the wound web was cooled, the core was pulled out and the web was cut into a length of 250 mm to obtain a cylindrical filter.

Results thus obtained are also shown in Table 4.

EXAMPLE 13

Polypropylene having a melting point of 165° C. and a MFR (230° C., 2.16 kg) of 13 g/10 min was spun into filaments at a spinning temperature of 300° C. and then the filaments were stretched to obtain fibers having a filamentary denier of 2 d. Finishing agent No. 1 was adhered to the fibers in an amount of 0.9% by weight and then cut into a length of 51 mm. The short fibers thus obtained were processed with a card machine to form a web having a basis weight of 30 g/m² and then the web was split into continuous strands spaced away from the neighboring ones by 100 mm to form slivers. The slivers were twisted into spun yarns of No. 1 count. The spun yarns were wound up on a plastic cylindrical core having an outside diameter of 30 mm and length of 250 mm, and having pores therethrough, at a winding angle of 24° until outside diameter of the wound spun yarns became 60 mm to obtain a yarn winding type filter.

Results thus obtained are also shown in Table 4.

TABLE 3

|  |  | Example 7 | Example 8 | Example 9 | Example 10 | Comparative Example 3 | Comparative Example 4 | Comparative Example 5 |
|---|---|---|---|---|---|---|---|---|
| No. of finishing agent | | 1 | 2 | 3 | 4 | 5 | 6 | 7 |
| Amount of adhered finishing agent (%) | | 0.9 | 0.9 | 0.9 | 0.9 | 0.9 | 0.9 | 0.9 |
| Safety test | | ○ | ○ | ○ | ○ | ○ | ○ | ○ |
| Foaming test of filtrate (mm) | Immediately after filtrate was put in measuring cylinder | 2 | 6 | 4 | 4 | 45 | 37 | 25 |
| | Immediately after filtrate was put in measuring cylinder and allowed to stand for 1 min | 0 | 0 | 0 | 0 | 43 | 31 | 13 |
| Particle removing efficiency (%) | 20 μm | 97.5 | 98.1 | 95.7 | 97.5 | 95.8 | 96.7 | 97.7 |
| | 30 μm | 99.9 | 99.9 | 99.9 | 99.9 | 99.9 | 99.9 | 99.9 |

TABLE 4

|  |  | Example 11 | Comparative Example 6 | Comparative Example 7 | Example 12 | Example 13 |
|---|---|---|---|---|---|---|
| No. of finishing agents | | 1 | 1 | 1 | 1 | 1 |
| Amount of adhered finishing agent (%) | | 0.2 | 0.07 | 1.5 | 0.9 | 0.9 |
| Safety test | | ○ | ○ | ○ | ○ | ○ |
| Foaming test of filtrate (mm) | Immediately after filtrate was put in measuring cylinder | 2 | — | 13 | 4 | 3 |
| | Immediately after filtrate was put in measuring cylinder and allowed to stand for 1 min | 0 | — | 2 | 0 | 0 |
| Particle removing efficiency (%) | 20 μm | 96.7 | — | 95.4 | 96.9 | 93.4 |
| | 30 μm | 99.9 | — | 99.9 | 99.9 | 99.7 |

Industrial Applicability

Since the hydrophilic fibers and cloths of the present invention have a durable hydrophilic property and are excellent in safety, the fibers and cloths can be used as raw materials, for example, as filter materials such as tea pack and the likes, drip absorbing materials for maintaining freshness of foods, and packaging materials for preventing dewing employed in the field of foods, and wiping cloths employed in the field of industry or medical care.

The filters of the present invention can safely be used in the field of foods, or in the field of industry and medical care since foaming of the filtrate from the filters is little and are excellent in safety.

What is claimed is:

1. A hydrophilic fiber produced by adhering 0.1 to 1.0% by weight, based on the weight of fiber, of a finishing agent comprising 20 to 90% by weight of the following composition (A) and 10 to 80% by weight of the following composition (B), to a fiber comprising one or more thermoplastic resins having a water absorption of 1% by weight or lower:

(A) a composition comprising 0 to 75% by weight of at least one sorbitan ester of a fatty acid having 12 to 18 carbon atoms and 25 to 100% by weight of at least one adduct of a sorbitan ester of a fatty acid having 12 to 18 carbon atoms with 5 to 20 mole of ethylene oxide;

(B) at least one compound selected from the group consisting of (a) white mineral oils, (b) diesters of a fatty acid having 12 to 18 carbon atoms with a polyethylene glycol having a molecular weight of 200 to 600, (c) diesters of a fatty acid having 12 to 18 carbon atoms with a polypropylene glycol having a molecular weight of 200 to 600, (d) pluronic type nonionic surface active agents, and (e) metal salts of an alkyl sulfonate having 8 to 16 carbon atoms.

2. The hydrophilic fiber according to claim 1 wherein the fiber comprising one or more thermoplastic resins is a composite fiber comprising two kind of thermoplastic resins having a difference in melting point of 10° C. or more.

3. The hydrophilic fiber according to claim 1 wherein at least one of the thermoplastic resins which form the fiber is a polyolefin resin.

4. The hydrophilic fiber according to claim 1 wherein at least one of the thermoplastic resins which form the fiber is a polyester resin.

5. A cloth obtained by entangling, adhering, weaving, or knitting the hydrophilic fibers defined in claim 1.

6. A hydrophilic cloth produced by adhering 0.1 to 1.0% by weight, based on the weight of fiber, of a finishing agent comprising 20 to 90% by weight of the following composition (A), and 10 to 80% by weight of the following composition (B), to a cloth composed of fibers comprising one or more thermoplastic resins having a water absorption of 1% by weight or lower:

(A) a composition comprising 0 to 75% by weight of at least one sorbitan ester of a fatty acid having 12 to 18 carbon atoms and 25 to 100% by weight of at least one adduct of a sorbitan ester of a fatty acid having 12 to 18 carbon atoms with 5 to 20 mole of ethylene oxide;

(B) at least one compound selected from the group consisting of (a) white mineral oils, (b) diesters of a fatty acid having 12 to 18 carbon atoms with a polyethylene glycol having a molecular weight of 200 to 600, (c) diesters of a fatty acid having 12 to 18 carbon atoms with a polypropylene glycol having a molecular weight of 200 to 600, (d) pluronic type nonionic surface active agents, and (e) metal salts of an alkyl sulfonate having 8 to 16 carbon atoms.

7. A filter fabricated by using the hydrophilic fiber defined in claim 1.

8. The filter according to claim 7 wherein the fiber comprising one or more thermoplastic resins is a composite fiber comprising two kind of thermoplastic resins having a difference in melting point of 10° C. or more.

9. A cloth obtained by entangling, adhering, weaving, or knitting the hydrophilic fibers defined in claim 2.

10. A cloth obtained by entangling, adhering, weaving, or knitting the hydrophilic fibers defined in claim 3.

11. A cloth obtained by entangling, adhering, weaving, or knitting the hydrophilic fibers defined in claim 4.

* * * * *